(12) United States Patent
Afflerbaugh

(10) Patent No.: US 6,728,459 B2
(45) Date of Patent: Apr. 27, 2004

(54) FILAMENT ORGANIZER

(75) Inventor: Martin G. Afflerbaugh, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 5 days.

(21) Appl. No.: 09/907,245

(22) Filed: Jul. 17, 2001

(65) Prior Publication Data

US 2003/0016933 A1 Jan. 23, 2003

(51) Int. Cl.[7] ................................................. G02B 6/00
(52) U.S. Cl. ....................................................... 385/135
(58) Field of Search ........................... 385/135, 59, 88, 385/92, 95, 70, 76, 136–137

(56) References Cited

U.S. PATENT DOCUMENTS

| | | | | |
|---|---|---|---|---|
| 3,798,099 A | * | 3/1974 | Marcatili ..................... | 385/135 |
| 4,029,390 A | * | 6/1977 | Chinnock et al. ............. | 350/96 |
| 4,033,668 A | | 7/1977 | Presby ......................... | 350/96 |
| 4,350,867 A | | 9/1982 | Kinoshita et al. | |
| 5,100,507 A | | 3/1992 | Cholewa et al. ............. | 156/651 |
| 5,315,489 A | * | 5/1994 | McCall et al. ............... | 361/801 |
| 5,390,268 A | * | 2/1995 | Morlion et al. ............... | 385/59 |
| 5,781,685 A | | 7/1998 | Simchock | |
| 6,187,378 B1 | | 2/2001 | Doncsecz | |
| 6,275,641 B1 | * | 8/2001 | Daoud ......................... | 385/135 |

OTHER PUBLICATIONS

International Search Report for PCT/US02/15488.

* cited by examiner

*Primary Examiner*—Jean F. Duverne
(74) *Attorney, Agent, or Firm*—Gregg H. Rosenblatt; Alan Ball

(57) ABSTRACT

A filament organizer comprises a filament container to hold a major portion of a filament. A filament clamp, having a spaced-apart relationship from the container; retains one or more filaments extending from the container. The filaments extend in a substantially parallel array over a frame between the container and the clamp. One embodiment of the present invention also includes a filament positioning frame comprising a first gripping plate attached in opposing relationship to a second gripping plate. The filament clamp is also held in spaced-apart relationship to the first gripping plate and the second gripping plate using the frame to join at least the first gripping plate to the filament clamp.

9 Claims, 3 Drawing Sheets

FILAMENT ORGANIZER

FIELD OF THE INVENTION

The invention relates to a filament organizer to prevent filament damage during transit and more particularly to an organizer of at least one filament in the form of an optical fiber to position the optical fiber during processing of an end thereof.

BACKGROUND OF THE INVENTION

Glass has been used for centuries as a material for controlling and modifying the properties of light beams. A recent and rapidly expanding application of the light modifying properties of glass structures involves the drawing of fine filaments of highly purified glass, more commonly referred to as optical fibers, that direct light signals between light transmitting and receiving locations. The use of optical fiber communication networks has grown to provide an alternative to coaxial cable systems. Advantages provided by optical fiber communications networks include lower cost, the use of fewer signal repeaters for correcting signal distortion, and a higher signal carrying capacity than coaxial cable networks.

Interconnection of fiber optic networks requires high precision devices in the form of optical connectors that join optical fibers to peripheral equipment and other optical fibers while maintaining adequate signal strength. In operation an optical connector centers the small fiber so that the light gathering core lies directly over and in alignment with a light transmitting source or another fiber. Following correct positioning of an optical fiber, known connecting structures such as crimped connections, soldered connections, spliced connections and the like may be used to maintain alignment between sections of optical fiber.

Soldered connections, in the form of optical fiber splices, terminations and hermetic seals, may include a thin metallic layer over the surface of an optical fiber adjacent to the position at which the splice, termination or seal will be made. Metal coating of terminal ends of optical fibers facilitates solder bonding and attachment of one optical fiber to another optical fiber, to a laser diode, to a ferrule and to connection points of optoelectronic devices.

U.S. Pat. No. 4,033,668 describes a method for joining a first glass member, such as an optical fiber, to a second member by means of solderable splices and terminations, which additionally can form hermetic seals. The splice, termination or seal may be formed after coating the peripheral surface of the glass member with a thin adhering metallic layer. After properly positioning the coated glass member, formation of a splice termination or seal with a corresponding member, may use heated solder to flow around the joint to form a bond between the members when cooled. When the second member is also formed of glass, a thin adhering metallic layer, similarly formed on the peripheral surface thereof, provides a solder receptive surface in the area of the intended joint. Metal may be applied to terminal portions of e.g. optical fibers by dipping them into a paste containing conductive metal particles.

U.S. Pat. No. 5,100,507 addresses finishing techniques for lensed optical fibers. The process of finishing an optical fiber places an integral lens and a metallized outer coating on the end of an optical fiber. Metal may be deposited on the ends of optical fibers using known sputtering techniques. Materials deposited in this way include titanium, platinum and gold. Application of metal close to the lensed end of an optical fiber allows the formation of a soldered connection very close to the tip of the fiber. This limits subsequent movement of a lensed fiber relative to an aligned optical device.

Prior description of soldered connections involves individual processing of metallized ends of optical fibers. Optical fiber handling represents a challenge for the optical fiber industry. Manufacturing operations may include a number of steps requiring handling of long and short lengths of optical fiber. These lengths of optical fiber are fragile filaments requiring careful handling and more efficient processes to accelerate the production of optical fibers for communication links and related devices. With a growing demand for optical fiber systems and devices, there is a need for processing a plurality of optical fibers simultaneously.

SUMMARY OF THE INVENTION

A filament organizer according to the present invention provides a suitable article for pre-positioning and holding a plurality of filaments, particularly optical fibers. Lengths of filaments, whether long or short, may be coiled inside suitably sized containers attached to a frame of the filament organizer. Pre-positioned filaments occupy a preferred and precise location and orientation allowing convenient treatment of terminal portions of filaments to apply materials over selected areas of the filaments. Suitable materials, such as metals and metal oxides, may be applied using, e.g. vapor deposition techniques. Metals may be applied to facilitate soldering and hermetic seal formation while the application of metal oxide and related materials may be used to apply e.g. a non-reflective coating over the surface of a filament.

A filament organizer according to the present invention further provides secure retention for an array of multiple optical fibers, precisely positioning their tips according to the requirements of designated process steps. This allows easier management of fiber tips, preventing them from making contact with each other during manufacturing processes. Use of a filament organizer allows consistent, reproducible placement of coatings and deposits, including inorganic coatings, organic coatings, antireflective coatings and combinations thereof, over a commonly prescribed area of each of a plurality of filament ends, such as the tips of optical fibers.

A preferred method of applying material, particularly oxide coatings, to the ends of filaments involves vapor deposition inside evacuated chambers. As an alternative, metal coatings may be applied to filaments using well known processes including electroless plating and electrolytic plating. Filament organizers according to the present invention may either include or be attached to a structure designed for use with suitable processing equipment. A filament organizer includes a filament clamp to hold the ends of filaments during coating, as by vacuum deposition of vaporized materials. The filament clamp may have process dependent, interchangeable parts depending upon the process in which it may be used.

More particularly a filament organizer comprises a filament container to hold a major portion of a filament. A filament clamp, having a spaced-apart relationship from the container, retains one or more filaments extending from the container. The filaments extend in a substantially parallel array over a frame between the container and the clamp. A frame has a first frame member parallel to a second frame member separated by the filament clamp.

The present invention also includes a filament positioning frame comprising a first gripping plate attached in opposing relationship to a second gripping plate. A filament clamp, is held in spaced-apart relationship to the first gripping plate and the second gripping plate using a frame that joins at least the first gripping plate to the filament clamp. The frame has a first frame member parallel to a second frame member.

Definitions

For clarification, the following definitions provide the meaning of terms that may be used throughout this specification.

The term "filament" refers thread-like structures preferably ceramic structures, particularly optical fibers.

Use of the terms "coating" or "deposit" herein refers to application of selected materials, including metals and metal oxides, to filament surfaces using any of a variety of methods of application, preferably vacuum coating or deposition. Coatings and deposits include known materials that provide antireflective coatings.

A "filament container" may include one or more "filament holders" in the form of substantially planar envelopes or pouches each holding a single filament. A stack of holders satisfies the definition of a container according to the present invention.

The beneficial effects described above apply generally to the exemplary devices and mechanisms disclosed herein of a filament organizer and a filament positioning frame. The specific structures through which these benefits are delivered will be described in detail hereinbelow.

BRIEF DESCRIPTION OF THE DRAWINGS

The invention will now be described in greater detail in the following way of example only and with reference to the attached drawings in which.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled;" this terminology's use contemplates elements being connected together in such a way that there may be other components interstitially located between the specified elements, and that the elements so specified may be connected in fixed or movable relation one to the other.

Figure 1:
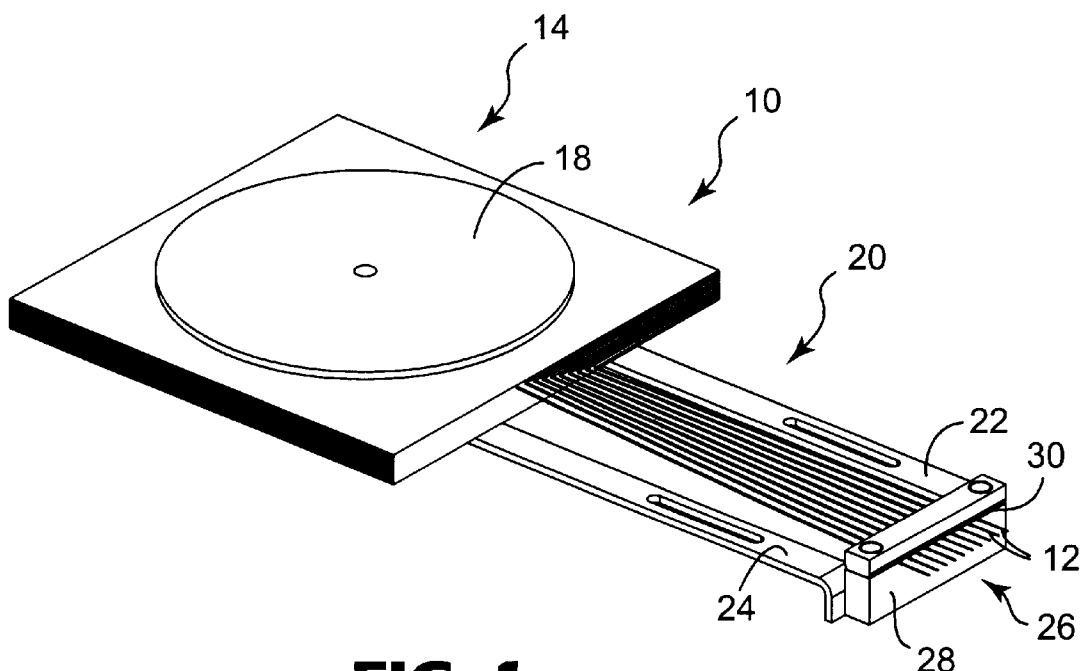
FIG. 1 is a perspective view representative of an apparatus according to the present invention for holding containers for filaments to be aligned and held in a prescribed spatial relationship.

Referring now to the figures wherein like numbers identify like parts throughout the several views, FIG. 1 provides a schematic perspective view of a filament-positioning frame 10 according to the present invention. The filament-positioning frame 10 provides a means for organizing a plurality of filaments 12 preferably in the form of optical fibers. Each of the filaments 12 extends from a coil of filament (not shown) conveniently stored in a holder, usually in the form of a plastic pouch or envelope. As indicated in FIG. 1, the filament-positioning frame 10 accommodates more than a single filament 12 requiring placement of multiple holders in the form of a stack of pouches 14. A stack of pouches 14, also designated herein as a container may be attached to the filament-positioning frame 10 using a lower, first gripping plate 16 (not shown) and a second gripping plate 18 on either side of the stack of pouches 14. Connection between the gripping plates may include a rod secured by a threaded stud. The gripping plates 16,18 may further be secured to one end of an organizing frame 20 that includes a first longitudinal frame member 22 and a second longitudinal frame member 24, which are in a parallel, spaced-apart relationship.

A filament clamp 26 also forms part of the organizing frame 20 to provide coupling of longitudinal frame members 22,24 so that they maintain their parallel relationship. The filament clamp 26 includes a support 28 for the plurality of filaments 12 extending from the stack of pouches 14. A retention clamp 30 engages the support 28 to capture the filaments 12 therebetween, to hold them in a prescribed spatial relationship relative to each other.

Figure 2:
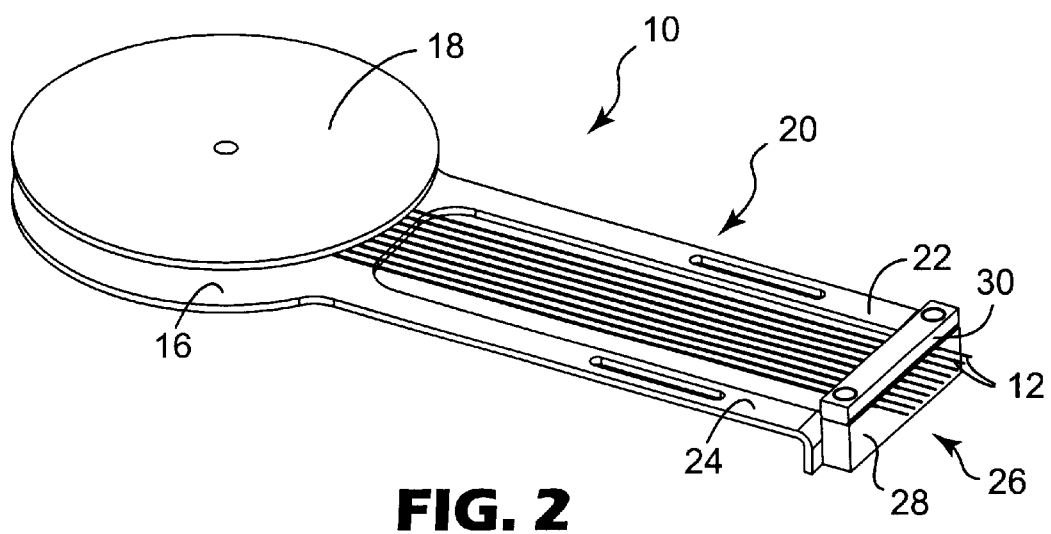
FIG. 2 is a perspective view to show the relationship between an upper, first gripping plate and a lower, second gripping plate.

FIG. 2 shows a preferred embodiment of a filament positioning frame 10 according to the present invention to clarify the construction and attachment of the first gripping plate 16. As shown, the first gripping plate 16 is an integral portion of the structure of the organizing frame 20. This structure is not to be viewed as limiting since it is conceivable to use other means for positioning and coupling a first gripping plate 16 to an organizing frame 20. The view of FIG. 2, omits containers of optical fibers to indicate the relationship between the first gripping plate 16 and the second gripping plate 18. Illustration of a plurality of filaments 12 shows the relationship of this parallel array to the first and second frame members 22, 24 and the extension of the ends of the filaments 12 beyond the filament clamp 26. Preferably individual filaments in the parallel array of filaments protrude an equal amount of approximately 5 mm beyond the filament clamp 26 to expose a consistent area at the tip of each filament 12 for material deposition.

Figure 3:
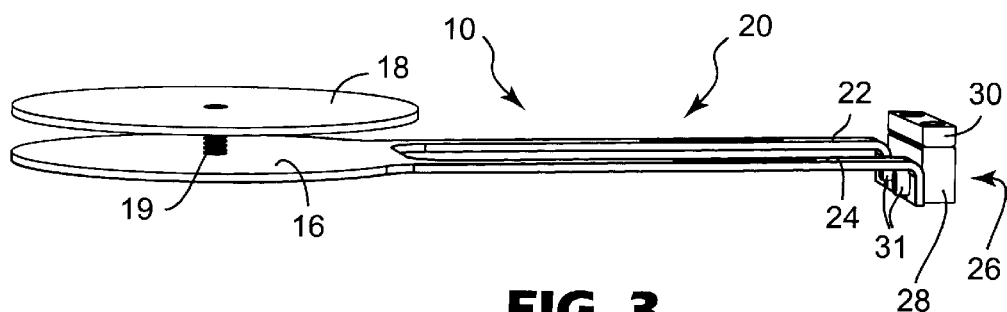
FIG. 3 provides a side perspective view of an organizing frame according to the present invention.

FIG. 3 provides a side perspective view of one embodiment of a filament positioning frame 10, which uses a post 19 as a means of connecting the first gripping plate 16 to the second gripping plate 18. It will be appreciated that these plates 16, 18 may use any of a number of commonly used methods and devices to provide connection therebetween. Preferably, the second gripping plate 18 is detachable from the first gripping plate 16 and the post or other fastening means allows variation in the separation between the gripping plates 16, 18. Such variation allows different numbers of individual containers 14 to fit between the gripping plates 16, 18.

Figure 4:
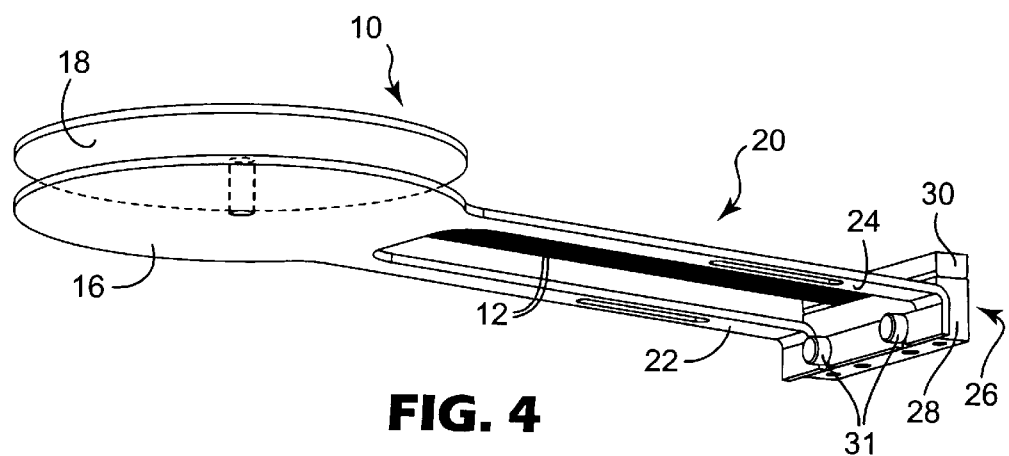
FIG. 4 shows a perspective view of the underside of an organizing frame according to the present invention.

FIG. 4 is a perspective view showing the underside of a filament positioning frame according to the present invention. This view shows one method for attaching a filament clamp 26 to an organizing frame 20. In this preferred embodiment, the means for connecting the organizing frame 20 to a filament clamp 26 includes one or more threaded bolts 31 for mating with threaded openings (not shown) formed in the support 28 of the filament clamp 26. This method for attaching an organizing frame 20 to a filament clamp 26 should not be considered limiting since other means for attachment fall within the scope of the present invention.

Figure 5:
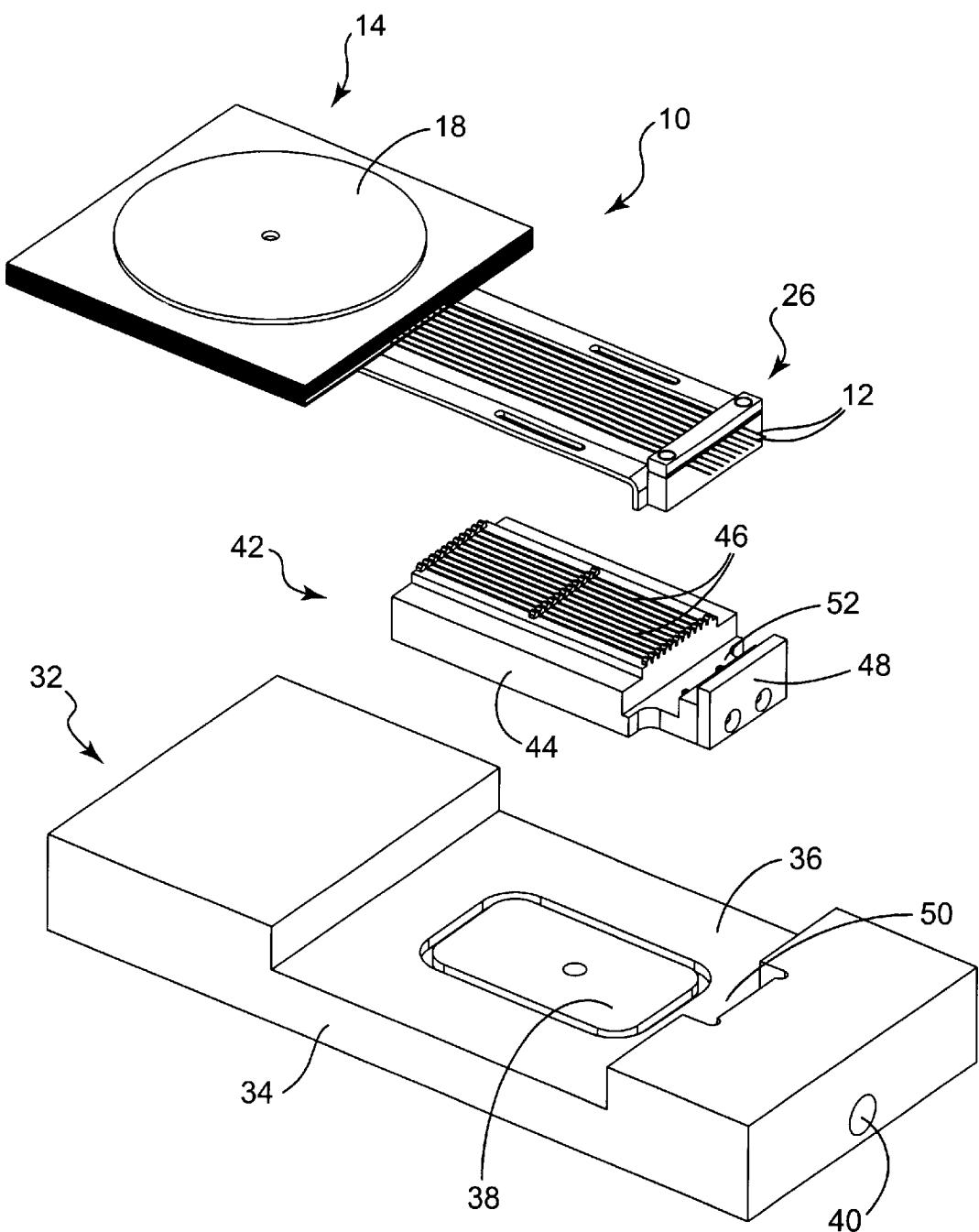
FIG. 5 is an exploded perspective view of an apparatus used to align filaments to be held in a prescribed spatial relationship.

Preferably the prescribed spatial relationship of filaments 12 remains consistent for each of a number of organizing frames 20. It is possible to provide consistent placement of filaments 12 using a positioning apparatus, also referred to herein as a filament locator 32. FIG. 5 shows a filament locator 32 that includes an organizing block 34 having a recess 36 with a vacuum holder 38 that has a connection to vacuum through the organizing block 34 via a vacuum port 40. An alignment block 42 fits into the recess 36 of the filament locator 32. The alignment block 42 includes a base plate 44 having an upper surface that includes a plurality of channels 46 in a parallel array. Precise positioning of the alignment block 42 occurs by detachable engagement between a positioning plate 48 on the alignment block 42 and a receiving groove 50 formed in the organizing block 34. After positioning the alignment block 42, as described, the application of reduced pressure to the vacuum port 40 draws the alignment block 42 into secure contact with the organizing block 34.

Figure 6:
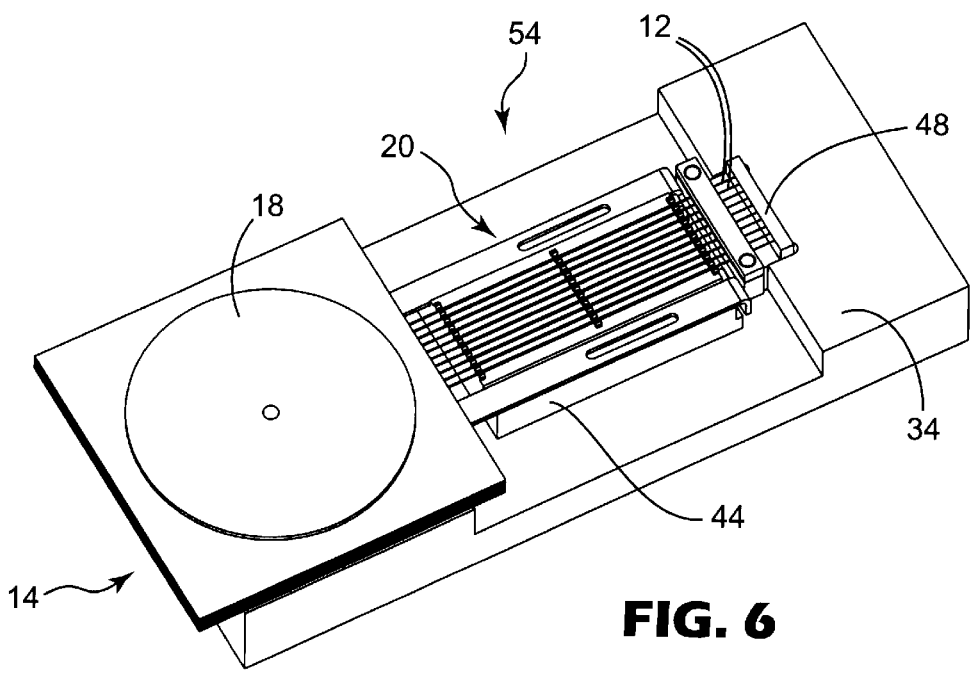
FIG. 6 is a perspective view showing a fully assembled fiber alignment apparatus according to the present invention.

A trough 52 in the alignment block 42 receives the filament clamp 26 of an organizing frame 20 to establish the correct positional relationship between these parts 42,20 and facilitate stringing of filaments between the outlets from each of the stack of pouches 14 and the support 28 of a filament clamp 26. Filament stringing involves drawing a filament end 12 from one of the stack of pouches 14 and laying it in a convenient channel 46 directing it towards the filament clamp 26. When all available fibers 12 have been placed in a parallel array, determined by the channels 46 in the alignment block 42, the filament clamp 26 may be closed to grip the filaments 12 to maintain the desired spatial relationship among the filaments 12. A particular organizing frame 20 may be removed from the filament locator 32 when it contains a strung and clamped set of filaments. It will be appreciated that any number of filament filled organizing frames 20 may be loaded using a filament locator 32 according to the present invention. FIG. 6 shows a filament alignment assembly 54 produced by placement of an organizing frame 20 in an alignment block 42 held in the recess 36 of an organizing block 34 by application of reduced pressure to the vacuum port 40.

A filament alignment assembly 54 and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. A filament organizer comprising:
   a filament container including at least one filament holder;
   a filament clamp, in spaced-apart relationship from said filament container, to retain a plurality of filaments, protruding from said at least one filament holder, in a substantially parallel array, said filament clamp including a support having an outer edge and a retention clamp to hold the substantially parallel array of filaments to extend beyond said outer edge when said support and said retention clamp directly contact each filament of the substantially parallel array of filaments for releasable retention thereof; and
   a frame connecting said filament container to said filament clamp, said frame including a first frame member parallel to a second frame member and separated therefrom by said filament clamp.

2. The filament organizer of claim, 1, wherein the filaments comprise optical fibers.

3. The filament organizer of claim 1, wherein said filament container comprises a plurality of filament holders.

4. The filament organizer of claim 3, wherein each said filament holder comprises a planar envelope.

5. The filament organizer of claim 4, wherein said filament container comprises a plurality of said planar envelopes distributed in a stack.

6. The filament organizer of claim 1, wherein said filament container resides between a first gripping plate and a second gripping plate having attachment to said frame.

7. A filament organizer comprising:
   a frame including a first frame member and a second frame member parallel to said first frame member and a first gripping plate attached to said first frame member and said second frame member;
   a filament clamp connected to said first frame member and said second frame member in spaced relationship from said first gripping plate, said filament clamp including a support and a retention clamp;
   a filament container comprising a plurality of filament holders each enclosing a filament to provide a plurality of filaments such that a portion of each of the plurality of filaments protrudes from said plurality of filament holders towards said filament clamp to be releasably secured between said support and said retention clamp, directly contacting said support and said retention clamp, wherein said support has an outer edge beyond which ends of the releasably secured plurality of filaments extend; and
   a second gripping plate detachably coupled to said first gripping plate to hold said filament container therebetween.

8. The of claim 7, wherein at least said first gripping plate is formed integrally with said frame.

9. The filament organizer of claim 7, wherein the filaments comprise optical fibers.

* * * * *

UNITED STATES PATENT AND TRADEMARK OFFICE
CERTIFICATE OF CORRECTION

PATENT NO.    : 6,728,459 B2
DATED         : April 27, 2004
INVENTOR(S)   : Afflerbaugh, Martin G.

It is certified that error appears in the above-identified patent and that said Letters Patent is hereby corrected as shown below:

Column 6,
Line 18, after "claim" delete ",".
Line 53, after "The" insert -- filament organizer --.

Signed and Sealed this

Twenty-first Day of September, 2004

JON W. DUDAS
*Director of the United States Patent and Trademark Office*